United States Patent [19]

Iida et al.

[11] 3,834,009

[45] Sept. 10, 1974

[54] METHOD OF CONTINUOUSLY PRODUCING A SYNTHETIC RESIN COATED PIPE

[75] Inventors: Kosuke Iida, Yohkaichi; Nobuo Kanada; Takeji Kurita, both of Mitsu-machi, all of Japan

[73] Assignee: Takiron Co., Ltd., Osaka, Japan

[22] Filed: May 14, 1973

[21] Appl. No.: 359,945

Related U.S. Application Data

[62] Division of Ser. No. 217,495, Jan. 13, 1972.

[52] U.S. Cl............... 29/477, 29/527.4, 117/75, 264/173, 425/381
[51] Int. Cl............................................. B23k 31/02
[58] Field of Search............. 29/477, 527.2, 527.4; 264/173; 117/75, 94; 156/305; 425/381

[56] References Cited
UNITED STATES PATENTS

| | | | |
|---|---|---|---|
| 2,963,045 | 12/1960 | Canevari et al. | 117/75 X |
| 3,497,466 | 2/1970 | Markulin et al. | 117/75 X |
| 3,520,966 | 7/1970 | Soffiantini | 425/381 |
| 3,559,280 | 2/1971 | Mailhiot et al. | 29/527.4 |
| 3,790,651 | 2/1974 | Meitinger | 264/173 X |

*Primary Examiner*—J. Spencer Overholser
*Assistant Examiner*—Robert J. Craig
*Attorney, Agent, or Firm*—Sughrue, Rothwell, Mion, Zinn & Macpeak

[57] ABSTRACT

A synthetic resin-coated pipe suitable for supporting plants or agricultural houses is composed of an elongated rigid pipe and a synthetic resin coating tightly coated thereon having annular projections disposed at regular intervals. Said synthetic resin-coated pipe is produced by making a hollow pipe from a band steel, subjecting the pipe to chemical treatment, coating the surface of the pipe with an adhesive, and after drying the adhesive, forming thereon a synthetic resin coating having annular projections at regular intervals by means of an extruder whose cross head die includes therein a projection forming member movable reciprocably in the axial direction in the space between the die body and the top of its mandrel.

5 Claims, 4 Drawing Figures

PATENTED SEP 10 1974
3,834,009
SHEET 1 OF 2
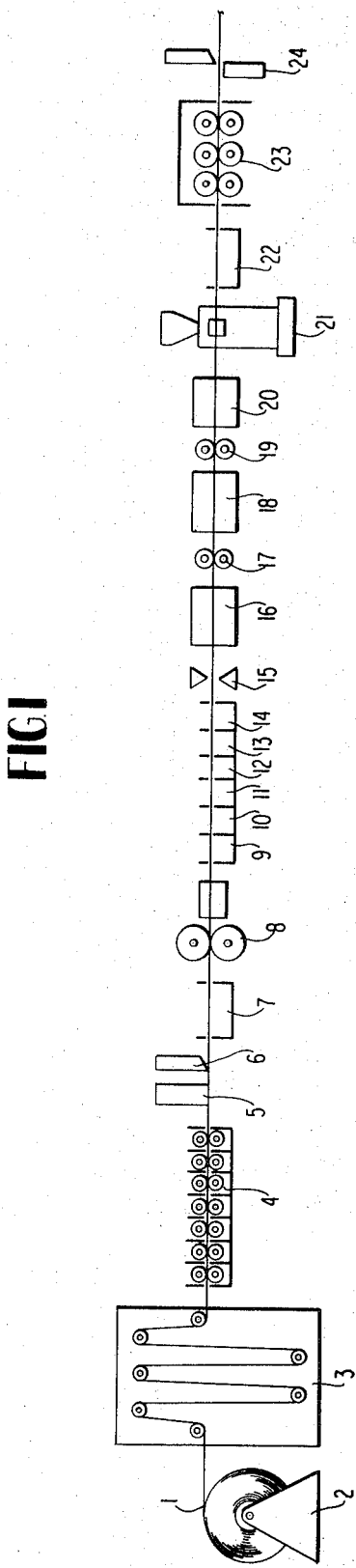
FIG 1
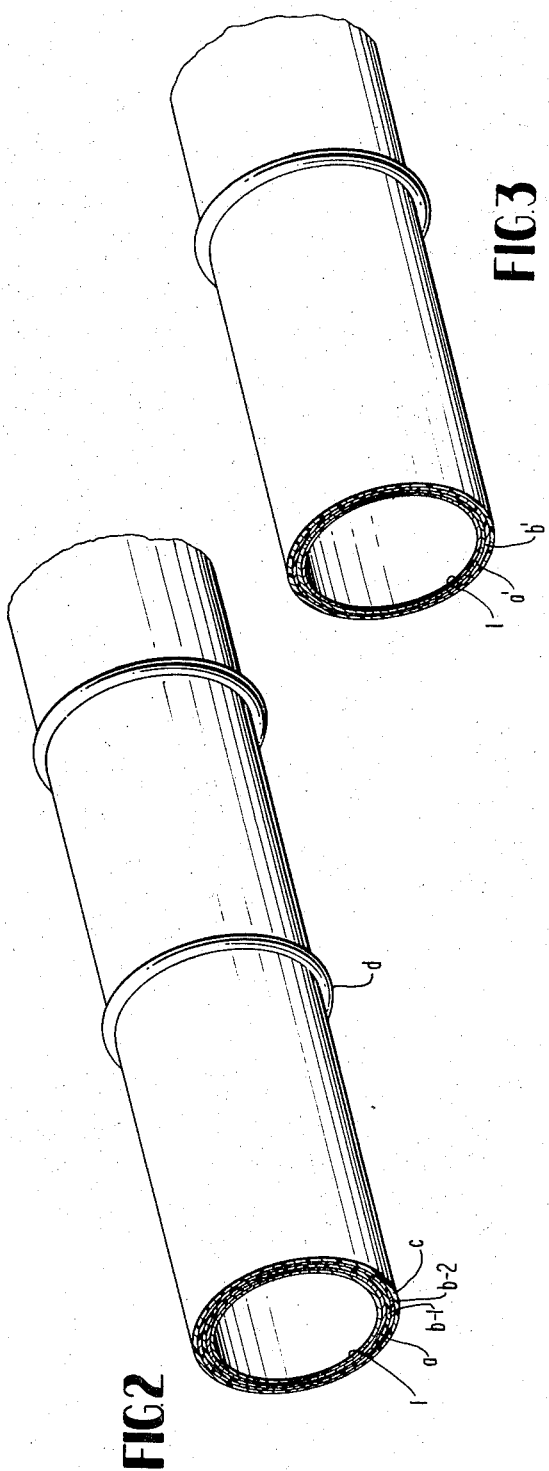
FIG 2
FIG 3

METHOD OF CONTINUOUSLY PRODUCING A SYNTHETIC RESIN COATED PIPE

This is a division of application Ser. No. 217,495, filed Jan. 13, 1972.

BACKGROUND OF THE INVENTION

1. Field of the Invention

The present invention relates to an elongated hollow pipe having suitable rigidity as a supporting pole necessary for growing plants and tightly coated with a synthetic resin coating having annular projections at regular intervals. The invention further relates to a continuous process of producing such synthetic resin-coated elongated pipe.

2. Description of the Prior Art

As supporting poles in agriculture or horticulture (such as poles for supporting large agricultural houses or plants under growing) natural bamboos or slender woods and paint coated steel pipes have hitherto been employed. However, the natural bamboos and slender woods have such difficulties that they cannot be used for a long period of time, since they are readily rotted or deteriorated. Furthermore, they may be attacked by noxious micro-organisms or insects, while the paint coated steel pipes present difficulties in that they cannot be used for a long period of time, since they are readily rusted due to the peeling of the coating.

For overcoming these difficulties of these conventional articles, a steel pipe coated with a synthetic resin has been proposed and for producing this synthetic resin-coated steel pipe, a method has been widely employed in which a synthetic resin is applied to the surface of a steel pipe of a definite length produced by the electric welding or solid drawing by means of coating, immersion, or extrusion molding.

However, because in such conventional method, a steel pipe of a definite length preformed by electric welding or solid drawing is used as a starting raw material, the cost for material is high. In addition it is difficult with such a method to coat the steel pipe continuously and quickly, with a synthetic resin. Therefore, owing to such unreasonable factors, the cost of the products obtained becomes higher, which gives a fatal restriction to the use of coated pipes to be used in the field of demand and specifically, an agricultural and horticultural field in which inexpensive articles are required. Also, when such a conventional synthetic resin-coated steel pipe having no projections on the surface thereof is used as a supporting pole for growing plants, the vines of a plant wound around the pole may readily slip down due to a strong wind. Further, because no adhesive is used in the formation of the synthetic resin coating on the steel pipe, the synthetic resin-coated pipe is liable to rust owing to local cracking or peeling of the resin coating by scratching. In light of the reasons mentioned above, synthetic resin-coated articles excellent in economy and function have been eagerly demanded in the aforementioned fields.

SUMMARY OF THE INVENTION

As the result of the inventor's investigations to overcome these difficulties, the inventors have discovered an elongated pipe, tightly coated with a synthetic resin coating having annular projections, which function excellently as a supporting pole and can be produced continuously and efficiently in a through process from a band steel material by providing an accumulator of band steel and an apparatus for forming steel pipes from the band steel prior to the known extrusion coating step and disposing a projection forming member reciprocally movable in the axial direction in the space between the die body and the top of a mandrel equipped at the top of an extruder. Also, the inventors have invented a process for producing this synthetic resin-coated steel pipe continuously.

Thus, an object of the present invention is to provide an elongated rigid pipe coated tightly with a synthetic resin coating having annular projections disposed at regular intervals.

Another object of this invention is to provide a process for continuously producing an elongated pipe coated with a synthetic resin coating having annular projections by forming a hollow pipe from a band of steel by means of a pipe-forming machine, welding the seam, subjecting the surface of the steel pipe thus formed to an alkali and a chemical treatment, applying to the surface thus treated an adhesive consisting of an organic solvent solution of a synthetic resin prepared by dissolving in an organic solvent at least one component selected from the group of a terpolymer of vinyl chloride, vinyl acetate and maleic anhydride; nitrile-butadiene rubber, chlorinated rubber, rubber hydrochloride; an epoxy resin-modified phenol resin or modified epoxy resin derivatives such as a dehydrated castor oil-modified epoxy resin, castor oil-modified epoxy resin, soyabean oil-modified epoxy resin, tung oil-modified epoxy resin, safflower oil-modified epoxy resin and linseed oil-modified epoxy resin; and a terpolymer of an acrylic ester, acrylamide and styrene, drying and baking the adhesive to fix the adhesive layer to the surface, and then forming on the adhesive layer, tightly, a synthetic resin coating having annular projections at regular intervals by the reciprocal motion of a projection-forming member disposed in an extruder.

DETAILED DESCRIPTION OF THE INVENTION

Brief Description of the Drawings

The invention will be illustrated in detail by the following examples and accompanying drawings, in which FIG. 1 is a schematic view showing an embodiment of the process of producing the synthetic resin-coated pipe according to this invention, FIG. 2 is a perspective view of an embodiment of the product obtained by the process of this invention, FIG. 3 is a perspective view of another embodiment of the product obtained by the process of this invention.

Figure 4:
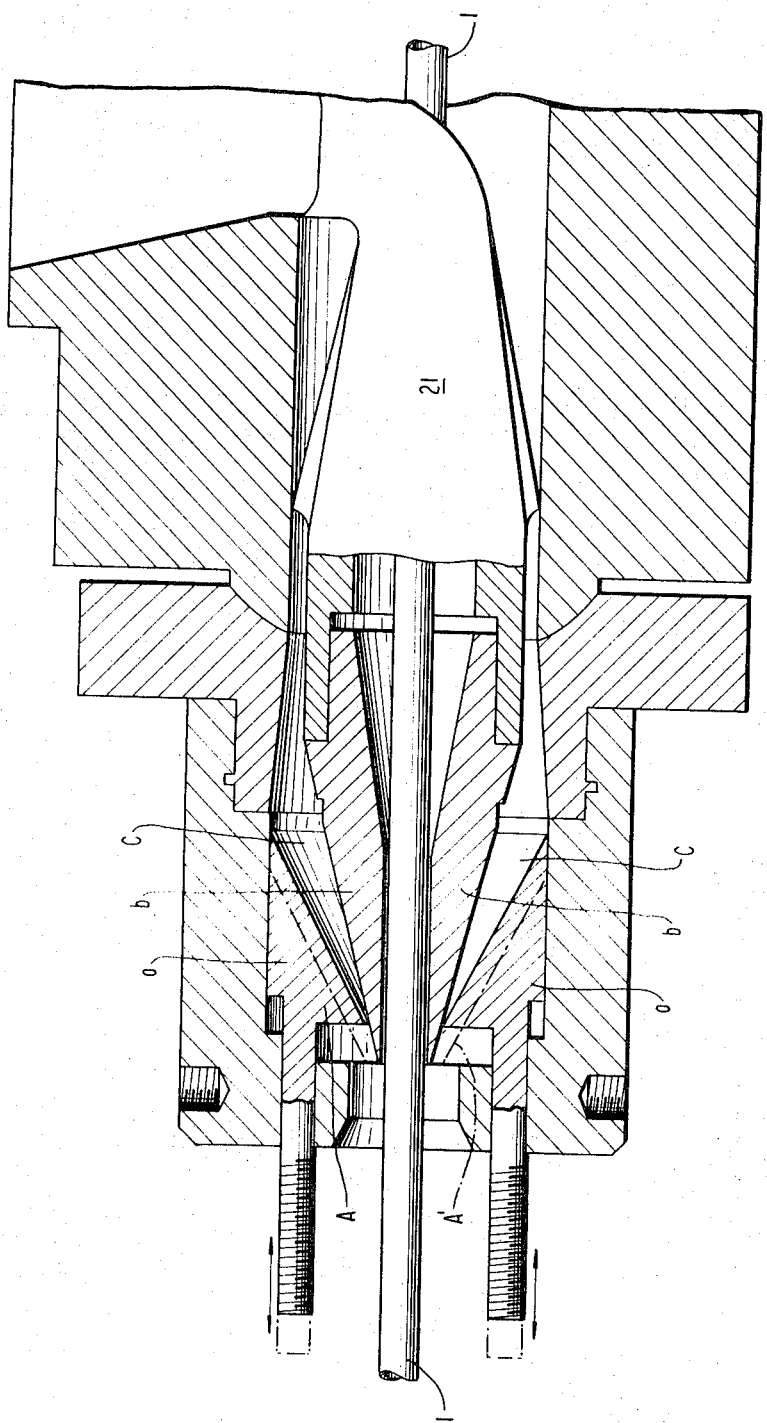
FIG. 4 is a cross section elevation view, partly broken away, showing a cross head die used in this invention.

However, the present invention is not deemed limited to the drawings and examples discussed herein.

EXAMPLE 1

Now, in FIG. 1, a band steel is supplied from a coil 1 supported by an uncoiler 2 and stored in a hoop cage 3. The hoop cage 3 is an accumulator for providing a running stock of the band steel to tide over interruptions of feed during joining operations of the band by the welder. The band steel withdrawn from the hoop cage 3 is continuously supplied to a forming machine 4, wherein the band steel is formed into a hollow pipe by means of forming rolls. The pipe thus formed is sent to a welder 5 to weld the seam of the pipe by high frequency-current heating under the pressure of squeezing rolls and in this case the bead formed by the welding operation at the outer surface of the pipe is then cut off immediately by means of a bead cutter 6. Then, the steel pipe is passed through a cooling apparatus 7 to be cooled to about room temperature and thereafter passed through a correcting apparatus to correct deviations in cross section formed by passing the welded pipe between vertical and horizontal rolls, which first press the pipe into a slightly oval shape, gradually approach it to the true circular section.

The elongated steel pipe thus corrected is sent to a pickling bath 9 in which the surface of the pipe is pickled with an aqueous hydrochloric acid solution of low concentration, at a low temperature to remove chemical impurities, such as red rust, black rust, soap, and lime from the surface of the pipe as water soluble salts. Then, the steel pipe, thus pickled is passed through a water bath 10 to completely wash out the acid residue from the surface thereof. Thereafter, the steel pipe is further sent to a defatting and derusting apparatus 11 to completely remove oils, fats, attached oxides remaining unchanged and smuts formed on the surface thereof by the pickling and thus to provide the highest activated clear surface possible.

The elongated steel pipe 1, thus activated, is passed through a hot water washing bath 12 into a chemical treatment bath 13 to form a phosphate layer thereon. Thereafter, the steel pipe is cleaned in a hot water bath 14, and then introduced into a water removing apparatus 15 to eliminate a trace of water attached to the surface of the pipe, and is completely dried in a hot air drying oven 16. Then, the surface of the steel pipe is coated evenly with an adhesive by means of an adhesive coater 17. The adhesive used in this step consists of an organic solvent solution of synthetic resins prepared by dissolving evenly, 15 percent by weight of a terpolymer of acrylic ester, acrylamide and styrene, and 4 percent by weight of an epoxy resin-modified phenol resin in 81 percent by weight of an organic solvent. Said solvent consists of acetone and toluene in a ratio of 1 : 4 by volume.

After coating the adhesive composition, the steel pipe is introduced into a hot air drying oven 18 to evaporate the solvent to form a first adhesive layer on the surface of the steel pipe. Then, the adhesive layer thus formed is further coated with a second adhesive prepared by dissolving evenly, 16 percent by weight of a terpolymer of vinyl chloride, vinyl acetate and maleic anhydride, and 6 percent by weight of a nitrile-butadiene rubber in 78 percent by weight of an organic solvent composed of acetone and toluene in a ratio of 1 : 1 by volume. The steel pipe is then passed through a tunnel type drying oven 20 to evaporate the solvent and permit baking, whereby a second adhesive layer is tightly formed on the first adhesive layer. Then, the steel pipe is passed through a cross head die 21 equipped at the top of an extruder wherein a vinyl chloride resin is continuously applied to the surface of the adhesive layer in an even thickness of 0.35mm. In this case, by moving reciprocally in an axial direction a projection forming member disposed in a space between the die body of the cross head die and the top of the mandrel, annular projections composed of the thick resin portions are formed.

The projection forming mechanism by the cross head die mentioned above will be illustrated in detail by the embodiment shown in FIG. 4. When a forming member (a) is at a position (A), the passage (C) at the exhausting portion for a molten resin formed between a mandrel (b) and the projection forming member (a) is narrow and hence a thin resin coating will be formed on the surface of the steel pipe 1 travelling through the central hole of the mandrel (b). If an annular projection is desired to be formed, the projection forming member (a) is rapidly moved in the axial direction from the position (A) to a position (A') and is stayed at the second position for a short period of from 0.2 to 0.5 seconds, whereby the space of the passage (C) at the exhausting portion between the top of the mandrel and the projection forming member (a) at the second position is broadened and a large amount of the molten resin is supplied in one operation through the broadened passage and provides an annular projection of a volume in proportion to the staying period of the projection forming member at the second position. Thereafter, the projection forming member (a) is brought back immediately to the first position (A) to continue the ordinary coating. By repeating, periodically, this operation, the annular projections are formed at regular intervals.

Now returning to FIG. 1, the steel pipe thus coated is introduced in a setting bath 22 to solidify the resin coating by cooling and then sent to a cutter 24 through a guide means 23 to be cut into a desired length as a product.

EXAMPLE 2

In a manner similar to Example 1, a band steel 1 is formed into a hollow pipe. The pipe thus formed is welded, washed with dilute acid and water successively, removed of oil and rust by defatting and derusting and then washed with hot water. Thereafter, the steel pipe is subjected to a phosphate layer treatment and coated evenly with an adhesive by an adhesive coater 17. The adhesive used in this step consists of an organic solvent solution of a synthetic resin prepared by dissolving evenly, 21 percent by weight of a synthetic resin in 79 percent by weight of a solvent mixed with methyl ethyl ketone and toluene in a ratio of 1 : 3 by volume, said synthetic resin consisting of 35 percent, by weight, of a terpolymer resin of vinyl chloride, vinyl acetate and maleic anhydride, 15 percent by weight of a nitrile-butadiene rubber, 39 percent by weight of a terpolymer of an acrylic ester, acrylamide and styrene and 11 percent by weight of an epoxy resin-modified phenol resin.

The steel pipe coated with said adhesive is passed through a tunnel type drying oven 18 to evaporate the solvent and to bake, whereby an adhesive layer is tightly formed on the surface of the steel pipe. Then, the steel pipe is passed through a cross head die 21 equipped at the top of an extruder, wherein a vinyl chloride resin is continuously applied to the surface of the pipe via the adhesive layer in an even thickness of 0.35 mm. After annular projections composed of the thick resin portions are formed, the steel pipe is cooled and cut into a desired length to give the product in FIG. 3.

EXAMPLE 3

In a manner similar to Example 1, a band steel 1 is formed into a hollow pipe. The pipe thus formed is welded, washed with dilute acid and water successively, removed of oil and rust by defatting and derusting, and then washed with hot water. Thereafter, the steel pipe is introduced into an adhesive coated 17 and coated evenly with an adhesive. The adhesive used in this step consists of an organic solvent solution of the synthetic resin prepared by dissolving evenly, 18 percent by weight of a terpolymer of an acrylic ester, acrylamide and styrene, and 6 percent by weight of an epoxy resin-modified phenol resin in 76 percent by weight of a solvent mixed with acetone and toluene in a ratio of 1 : 5 by volume.

The steel pipe coated with the said adhesive is passed through a hot air drying oven 18 in order to evaporate the solvent, whereby the first adhesive layer is formed on the surface of the steel pipe. Then, the steel pipe thus coated with the first adhesive is introduced into the second adhesive coater 19 and further coated with the second adhesive prepared by dissolving evenly, 20 percent by weight of a terpolymer of vinyl chloride, vinyl acetate and maleic anhydride, and 7 percent by weight of a nitrile-butadiene rubber in 73 percent by weight of a solvent mixed with methyl ethyl ketone and toluene in a ratio of 1 : 1 by volume.

The steel pipe thus coated is then passed through a tunnel type drying oven 20 to evaporate the solvent and to bake, whereby the second adhesive layer is tightly formed on the first adhesive layer. Then, the steel pipe is passed through a cross head die 21 equipped at the top of an extruder, wherein a vinyl chloride resin is continuously applied to the surface of the adhesive layer in an even thickness of 0.35 mm. After annular projections composed of the thick resin portions are formed, the steel pipe is cooled and cut into a desired length to give the product.

EXAMPLE 4

In a manner similar to Example 3, a band steel 1 is formed into a hollow pipe. The pipe thus formed is welded, washed with dilute acid and water successively, removed of oil and rust by defatting and derusting, and then washed with hot water. Thereafter, the steel pipe is coated evenly with an adhesive by an adhesive coater 17. The adhesive used in this step consists of an organic solvent solution of a synthetic resin prepared by dissolving evenly, 15 percent by weight of a synthetic resin in 85 percent by weight of a solvent mixed with methyl ethyl ketone and toluene in a ratio of 1 : 5 by volume, the said synthetic resin consisting of 38 percent by weight of a terpolymer of vinyl chloride, vinyl acetate and maleic anhydride, 10 percent by weight of a nitrite butadiene rubber, 36 percent by weight of a terpolymer of acrylic ester, acrylamide and styrene, and 16 percent by weight of an epoxy resin-modified phenol resin.

The steel pipe coated with the said adhesive is passed through a tunnel type drying oven 18 to evaporate the solvent and to bake, whereby an adhesive layer is formed thereon. Then, the steel pipe is passed through a cross head die 21 equipped at the top of an extruder wherein a vinyl chloride resin is continuously applied to the surface of the pipe via the adhesive layer in an even thickness of 0.35 mm. After annular projections composed of the thick resin portions are formed, the steel pipe is cooled and cut into a desired length to yield the product.

The composition of the adhesive in the present invention is not limited to the exemplified combination but may be of any composition so long as it enables a resin coating to adhere tightly to a steel pipe by forming chemical bonds among them. For the purpose of the present invention, the adhesive layer formed on the surface of the steel pipe is sufficiently effected with one layer thereof. However, when two layers, which consist of the first adhesive layer of a resin having a high adhesion to the steel pipe as an adhesive component and the second adhesive layer of a resin having a high adhesion to a resin for coating as an adhesive component are formed, resin coating may more tightly adhere to the steel pipe than when one layer alone is formed.

Besides the solvents used in the above Example, there are ketones, such as methyl isobutyl ketone or diacetone alcohol, esters, such as ethyl acetate, butyl acetate, amyl acetate or cellusolve acetate, mono-alkyl esters, such as methyl cellosolve, ethyl cellosolve, butyl cellosolve or dioxane, aromatic hydrocarbons, such as benzene, xylene, or solvent naphtha, and monochlorinated hydrocarbons, such as dichloroethane, monochlorobenzene, o-dichlorobenzene or trichloroethylene. These solvents can be used alone or in admixture in which an adhesion strength similar to the Examples set out above is obtained.

FIG. 2 is a perspective view showing the product obtained by the aforesaid process. As shown in the figure, the steel pipe 1 has on the surface thereof the phosphate layer (*a*) formed by the chemical treatment as mentioned above and on the surface of the phosphate layer, there is tightly formed, the first adhesive layer (*b*-1) comprising a terpolymer of an acrylic ester, acrylamide and styrene having high adhesion to the phosphate layer and steel pipe, and an epoxy resin-modified phenol resin or modified epoxy resin derivatives, such as a dehydrated castor oil-modified epoxy resin, soybean oil-modified epoxy resin, tung oil-modified epoxy resin, safflower oil-modified epoxy resin and linseed oil-modified epoxy resin, each having a compatibility with the above-mentioned terpolymer and functional groups. In addition, on the first adhesive layer, there is formed the second adhesive layer (*b*-2) mainly comprising a terpolymer of vinyl chloride, vinyl acetate and maleic anhydride having high adhesion to the vinyl chloride resin coating (*c*) blended therewith, nitrile-butadiene rubber, chlorinated rubber or rubber hydrochloride each of which is miscible with the above terpolymer and has strong polar groups and functional groups to react with others. On the second adhesive layer, there is formed the vinyl chloride resin coating (*c*) closely to the second adhesive layer (*b*-2) and the annular projections (*d*) made of the same material as the vinyl chloride resin are formed at regular intervals. Thus, the feature of the embodiment of the resin-coated steel pipe of this invention shown in FIG. 2 is in the point that the synthetic resin coating (*c*) lacking in chemical affinity with the surface of the pipe 1 is applied thereto tightly via the adhesive layers having high chemical affinity to the surface of the pipe 1 and the synthetic resin coating (*c*).

In addition, as shown in FIG. 3, the composition for the first adhesive layer is mixed with the composition of the second adhesive layer and the mixture is applied to the surface of the phosphate layer (*a'*) by means of a coater 17 to provide an adhesive layer (*b'*). In this embodiment, the coater 19 and the treatment in the tunnel drying furnace 20 can be omitted.

The present invention has many advantages as follows; that is, because a band of steel is employed as the starting material in this invention, the cost of the starting material is low as compared with the conventional process in which a steel pipe of a definite length is preformed by electric welding or solid drawing. Furthermore, with the process of this invention, a resin-coated pipe having a desired shape or diameter can be produced. Also, in the process of this invention since a coil of band steel can be employed as the starting material and the steel pipe can be continuously produced in a through process by means of seam welding from the coiled band steel, a pipe having homogeneous quality can be obtained, largely with a low cost.

Furthermore, when the resin-coated pipe having annular projections at regular intervals prepared by the process of this invention is used as a support necessary for growing plants, the vine of the plant readily winds around the support and the problem of the slipping down of the vine by strong wind and the like is reduced as compared with conventional resin-coated elongated pipe which does not exhibit such projections. Also, when a large number of the resin-coated pipes of this invention are used in a bundle, they can be firmly set by a string, etc.

Moreover, as compared with the conventional supports made of natural bamboos or slender woods, the resin-coated elongated pipe of this invention has an excellent corrosion resistance to moisture, water and agricultural chemicals and is not readily attacked by noxious insects. In addition, it can be produced in a uniform shape and even quality with a large production scale and further, is readily handled without scratching the surface thereof by thorns, owing to the tight coating of the vinyl chloride resin via an adhesive layer to the surface of the pipe.

The resin-coated pipe of this invention can be used not only as substitutes of bamboos and slender woods for growing plants, but also as substitutes for cords, ropes, and threads for growing the vines of cucumber, gourds, hops, etc. In particular, it can make a great contribution in providing useful articles in the agricultural field and other related fields.

Although the present invention has been adequately described in the foregoing specification and examples included therein, it is readily apparent that various changes and modifications can be made without departing from the spirit and scope thereof.

What is claimed is:

1. A method for continuously producing an elongated pipe, suitable for use as a supporting pole for growing plants, tightly coated with a synthetic resin coating and having annular projections, which comprises:
   a. forming a hollow elongated pipe from an elongated band of metal by means of a forming machine and welding the seam,
   b. subjecting the surface of the pipe thus prepared to an alkali treatment and a chemical treatment,
   c. coating the surface of the pipe thus treated with an adhesive consisting of an organic solvent solution of at least one component selected from the group consisting of a terpolymer of vinyl chloride, vinyl acetate and maleic anhydride, a nitrile-butadiene rubber, as epoxy resin-modified phenol resin, a dehydrated castor oil-modified epoxy resin, and a terpolymer of an acrylic ester, acrylamide and styrene, followed by
   d. drying and baking the layer formed, and
   e. applying to the surface of the adhesive layer a synthetic resin coating having annular projections at regular intervals by means of an extruder having a cross head die including therein, in the space between the die body and the top portion of the mandrel a projection forming member movable reciprocally in the axial direction.

2. A method for continuously producing an elongated pipe suitable for use as a supporting pole for growing plants tightly coated with a synthetic resin coating having annular projections at regular intervals which comprises:
   a. forming a hollow elongated pipe having a proper rigidity from an elongated band of metal by means of a forming machine,
   b. welding the seam of the pipe,
   c. subjecting the surface of the pipe to an alkali treatment and a chemical treatment,
   d. forming tightly on the treated surface of the pipe a first adhesive layer by applying to the surface an organic solvent solution of a mixture of a terpolymer of an acrylic ester, acrylamide and styrene, and an epoxy resin-modified phenol resin, followed by
   e. drying,
   f. forming further on the surface of the first adhesive layer a second adhesive layer by applying to the surface an organic solvent solution of a mixture of a terpolymer of vinyl chloride, vinyl acetate and maleic anhydride, and a nitrile-butadiene rubber, followed by
   g. drying and backing the layer formed, and
   h. applying to the second adhesive layer a synthetic resin coating having annular projections at regular intervals by means of an extruder having a cross head die including therein, in the space between the die body and the top portion of a mandrel, a projection forming member movable reciprocally in the axial direction.

3. The method of claim 2 wherein the composition for said first adhesive layer contains the terpolymer of acrylic ester, acrylamide and styrene in a proportion of 61 – 85 percent by weight and the epoxy resin-modified phenol resin in a proportion of 15 – 39 percent by weight and the composition of said second adhesive layer contains the terpolymer of vinyl chloride, vinyl acetate and maleic anhydride in a proportion of 65 – 75 percent by weight, and the nitrile-butadiene rubber in a proportion of 25 – 35 percent by weight.

4. A method for continuously producing an elongated pipe suitable as a support for growing plants, coated with a synthetic resin coating having annular projections at regular intervals, which comprises:
   a. forming a hollow elongated pipe having a proper rigidity from an elongated band of metal by means of a forming machine,
   b. welding the seam of the pipe,
   c. subjecting the surface of the pipe to an alkali treatment and a chemical treatment,
   d. forming tightly on the treated surface of the pipe a first adhesive layer by applying to the surface an organic solvent solution of a mixture of a terpolymer of an acrylic ester, acrylamide and styrene, and a dehydrated castor oil-modified epoxy resin followed by e. drying and baking, f. forming further on the surface of the first adhesive layer a second adhesive layer by applying to the surface, an organic solvent solution of a mixture of a terpolymer of vinyl chloride, vinyl acetate and maleic anhydrides, and a nitrile-butadiene rubber, followed by g. drying and baking, and h. applying, tightly to the second adhesive layer a synthetic resin coating having annular projections at regular intervals by means of an extruder having a cross head die including therein in the space between the die body and the top portion of a mandrel a projection forming member movable reciprocally in axial direction.

5. The method of claim 4, wherein the composition for said first adhesive layer contains the terpolymer of acrylic ester, acrylamide and styrene in a proportion of 65 – 85 percent by weight and the dehydrated castor oil-modified epoxy resin in a proportion of 15 – 35 percent by weight and the composition of said second adhesive layer contains the terpolymer of vinyl chloride, vinyl acetate and maleic anhydride in a proportion of 65 – 75 percent by weight and the nitrile-butadiene rubber in a proportion of 25 – 35 percent by weight.

* * * * *